United States Patent [19]
Giltner

[11] Patent Number: 5,985,415
[45] Date of Patent: Nov. 16, 1999

[54] FINGER JOINT ARCHITECTURE FOR WOOD PRODUCTS, AND METHOD AND APPARATUS FOR FORMATION THEREOF

[75] Inventor: Jon X. Giltner, Boulder, Colo.

[73] Assignee: ReConnX, Inc., Boulder, Colo.

[21] Appl. No.: 08/971,638

[22] Filed: Nov. 17, 1997

[51] Int. Cl.⁶ .................................................... F16B 7/00
[52] U.S. Cl. ............................ 428/192; 428/58; 428/60; 403/364
[58] Field of Search ................................. 428/60, 58, 192; 403/364; 52/726.1

[56] References Cited

U.S. PATENT DOCUMENTS

| 389,684 | 9/1888 | Beach | 403/364 |
|---|---|---|---|
| 545,375 | 8/1895 | Olds | 403/364 |
| 557,967 | 4/1896 | Carr | 403/364 |
| 2,267,330 | 12/1941 | Goss | 403/364 |
| 3,355,196 | 11/1967 | Harrison | 403/364 |
| 3,692,340 | 9/1972 | Roth | 52/726.1 |
| 3,970,401 | 7/1976 | Lubeck | 403/265 |
| 4,624,295 | 11/1986 | Howland | 144/347 |
| 5,584,328 | 12/1996 | Grisley | 144/145.3 |

FOREIGN PATENT DOCUMENTS 266564  1/1932  Italy .

OTHER PUBLICATIONS

Western Wood Products Association; "Structural–Glued Lumber", Jan. 1995.

*Primary Examiner*—Alexander Thomas
*Attorney, Agent, or Firm*—Harold A. Burdick

[57] ABSTRACT

A finger joint architecture, method and formation apparatus are disclosed, the finger joint architecture characterized by an array of interspersed projections and cavities formed at an end face of a first wood product. The projections are spaced from one another in both first and second dimensions defining the end face and are formed by the cavities which are bored through the end face. A mating array of projections and cavities is formed at an end of another wood product to be secured to the first wood product. The projections and cavities thus formed are preferably tapered.

18 Claims, 10 Drawing Sheets

FINGER JOINT ARCHITECTURE FOR WOOD PRODUCTS, AND METHOD AND APPARATUS FOR FORMATION THEREOF

FIELD OF THE INVENTION

This invention relates to joints utilized for joining smaller segments of wood products to form larger segments, and, more particularly, relates to finger joints and methods and apparatus for formation of such finger joints.

BACKGROUND OF THE INVENTION

Structural glue-jointed wood products, such as dimensional lumber, is gaining greater acceptance for a wide variety of applications in the building and construction industry. Recognition that efficient utilization of wood resources will continue to be necessary, that reduction of flow to local land fills is a priority in many locations, and cost and reliability factors have continued to fuel the desire to make more of such jointed product available.

However, current finger-jointing technology has not changed substantially to keep pace with the demand. Scarf joints and finger joints of various types have long been utilized, improvements lying primarily in the field of new adhesives and/or adhesive application techniques. While many are acceptable for some applications, few if any of the known joints have proved effective for application under all significant loading conditions (tension, compression, bending, torsion and shear).

Moreover, greater efficiencies and ease of manufacture could still be utilized. Scarf joints, for example, require large amounts of wood removal for joint construction. Most current finger joint production requires provision of large-scale (and, thus centralized) production facilities, thereby necessitating shipment of scrap lumber to the facility, often from great distances. Specialized handling of jointed materials due to fragility of the freshly glued joints is also often required. The shipping requirement increases cost and energy consumption for production, and deters many non-local companies from use of this alternative, while the special handling requirements increase cost and space requisites (production and storage) of such facilities. In addition to the high cost of industrial finger jointing equipment, smaller scale operations are thus discouraged.

Additionally, traditional facilities are not able to process post-consumer, possibly contaminated lumber because the blades necessary to production of known joints are at risk of damage by foreign materials commonly found in post-construction scrap, demolition scrap, and the like. A finger joint construction modeled for use of such post-consumer scrap would, it accepted, greatly reduce the volume of land filled construction and demolition waste.

SUMMARY OF THE INVENTION

This invention provides a finger joint architecture, formation method and apparatus designed for use with all variety of wood product (including dimensional lumber and logs, without regard to species), including post-consumer scrap, and for utilization without regard to the particular loading conditions (tension, compression, bending, torsion and/or shear) which may be encountered. The finger joint architecture and formation method is well adapted to smaller scale operations than heretofore known, including mobile manufacturing sites. Specialized handling of freshly jointed materials is not required, and wood removal in manufacture is minimized.

The finger joint architecture of this invention is formed at a surface area of a first wood product and is adapted for securement at a selectively configured formation in a second wood product. The finger joint architecture is characterized by plural series of projecting members, the projecting members in any one series being spaced from one another and from the projecting members in any adjacent series. The projecting members are defined by a plurality of longitudinal cavities bored through the surface area into the wood product.

The jointed wood product thus formed when the first and second wood products are adhesively secured at the joint is characterized by a joint cross section showing plural non-linear adhesive lines, at least some of which are endless defining plural wood product interfaces entirely interior the joint cross section.

The joint forming method of this invention includes the steps of forming in a first wood product section end an array of interrelated projections and cavities interspersed in both first and second dimensions relative to an end face of the first wood product section end. A mating array of interrelated projections and cavities is formed in a second wood product section end, the first and second wood product section ends thus arrayed being joined. The projections are preferably tapered in the direction of projection comprising a third dimension relative to the first and second dimensions. The cavities are also preferably tapered.

The apparatus for formation of a joint architecture at a selected surface area of a wood product of this invention includes a plurality of rows of spaced cavity forming means, drive structure for driving the cavity forming means, and a guide for directing the wood product at the cavity forming means.

It is therefore an object of this invention to provide an improved finger joint architecture and finger joint formation method and apparatus.

It is another object of this invention to provide a finger joint architecture, formation method and apparatus designed for use with all variety of wood product, including post-consumer scrap, and for a variety of utilization conditions.

It is still another object of this invention to provide a finger joint architecture and formation method and apparatus well adapted to small scale operations, requiring little or no specialized handling of freshly jointed materials, and that minimizes wood product waste.

It is yet another object of this invention to provide a finger joint architecture formed at a surface area of a first wood product and adapted for securement at a selectively configured formation in a second wood product, the finger joint architecture characterized by plural series of projecting members wherein the projecting members in any one series are spaced from one another and from the projecting members in any adjacent series.

It is still another object of this invention to provide a wood product formed from at least first and second wood product sections adhesively secured at a joint characterized by a joint cross section showing plural nonlinear adhesive lines.

It is still another object of this invention to provide a wood product having a joint wherein at least some adhesive lines shown at a joint cross section are endless thus defining plural first and second wood product section interfaces entirely interior the joint cross section.

It is yet another object of this invention to provide a joint forming method for wood products including the steps of forming in a first wood product section end an array of interrelated projections and cavities interspersed in both first and second dimensions relative to an end face of the first wood product section end, forming a mating array of interrelated projections and cavities in a second wood product section end, and joining the first and second wood product section ends thus arrayed.

It is yet another object of this invention to provide an apparatus for formation of a joint architecture at a selected surface area of a wood product having a plurality of rows of spaced cavity forming means, drive structure for driving the cavity forming means, and a guide for directing the wood product at the cavity forming mean, to thus form the architecture at the selected surface area.

With these and other objects in view, which will become apparent to one skilled in the art as the description proceeds, this invention resides in the novel construction, combination, arrangement of parts and method substantially as hereinafter describe, and more particularly defined by the appended claims, it being understood that changes in the precise embodiment of the herein disclosed invention are meant to be included as come within the scope of the claims.

BRIEF DESCRIPTION OF THE DRAWING

The accompanying drawings illustrate a complete embodiment of the invention according to the best mode so far devised for the practical application of the principles thereof, and in which.

DESCRIPTION OF THE INVENTION

Figures 1, 2:
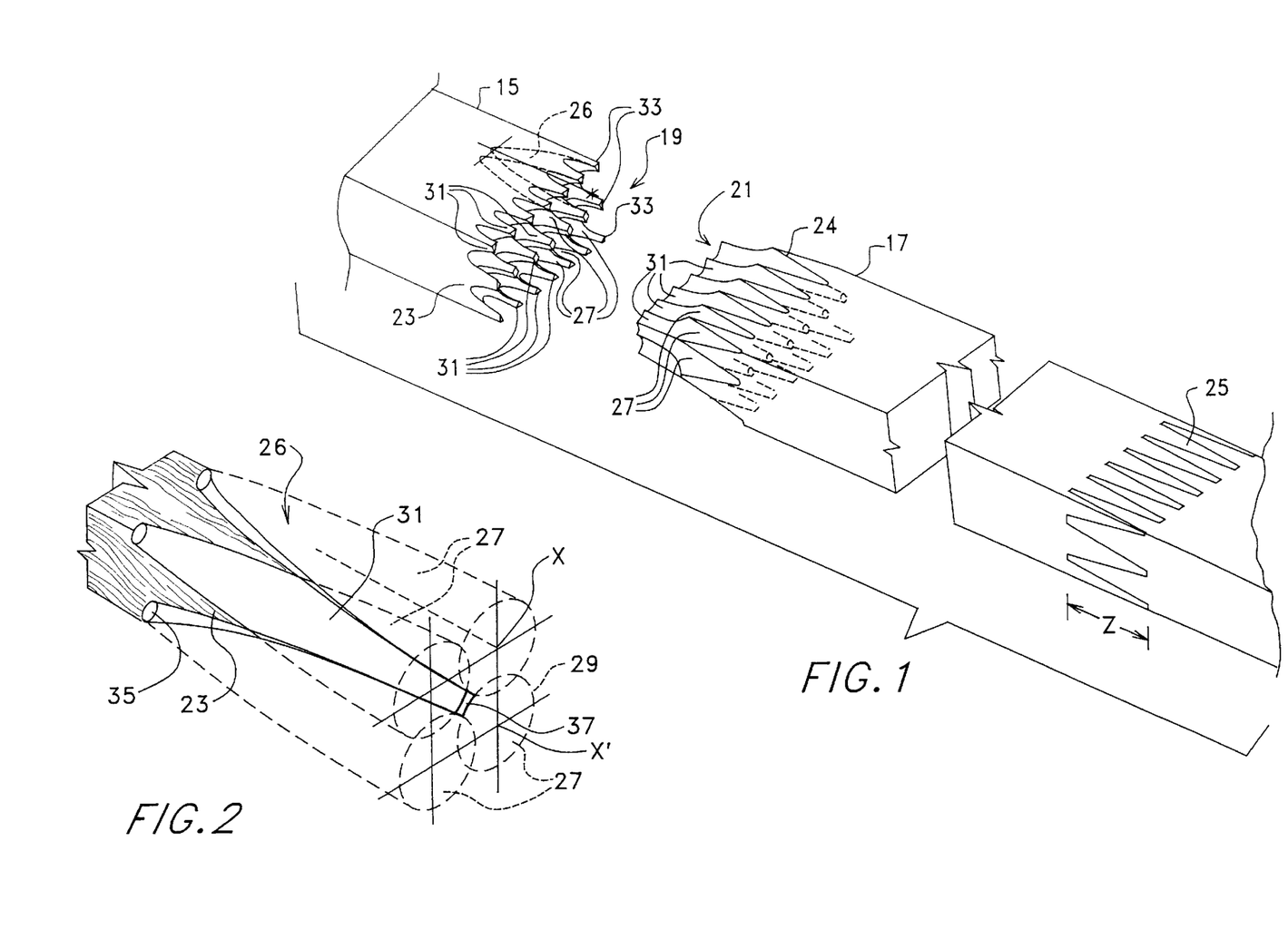
FIG. 1 is an exploded perspective view of a finger joint in accord with this invention.
FIG. 2 is an enlarged partial perspective view of a portion of the finger joint architecture illustrated in FIG. 1.

FIG. 1 shows two wood product (in this case dimensional lumber) sections, or segments, 15 and 17 having finger joint architecture 19 and mating architecture 21 formed at the ends 23 and 24 thereof, respectively. The sections are aligned for joining (with adhesive application, the nature of the adhesive utilized being any of those currently known for such use) to form a finished joint, as shown at 25, and thereby a unitary wood product.

Wood is orthotropic, i.e., having different mechanical properties in the directions of three mutually perpendicular axes, longitudinal, radial, and tangential. The finger joint architecture and method of this invention is particularly well adapted to applications along the longitudinal axis (i.e., parallel to the wood grain generally parallel with the wood product segment's length), the axis of greatest strength. Each wood product section may be of any dimension regarding length, width, or thickness, any species, may have any moisture content, any degree of curvature, twist, or straightness, any quantity, size, and arrangement of checks, splits, and knots parallel to grain or perpendicular to grain, and any strength.

At each section end, the wood fibers in the immediate length Z of the proposed joint, and for the full cross sectional area of the joint, should be sound and machineable, and for best results should be reasonably parallel within the length Z. Specifically, checks and splits may be present, but preferably not sizeable knots. For used lumber, foreign matter, such as embedded concrete or nails, should not be present, but holes remaining from removed foreign matter present no problems.

Figure 3A:
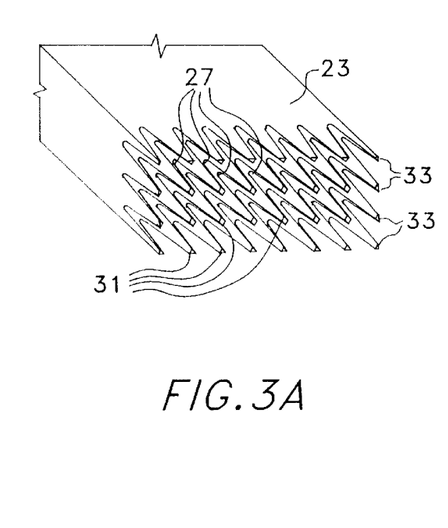
FIG. 3A is a perspective end view showing the finger joint architecture as formed at a first section end of a particular dimensional wood product.

FIG. 2 shows a detailed interrelated portion 26 of architecture 19. The dotted lines represent areas of removed matter forming cavities, or bores, 27 through uninterrupted surface area (end face) 29 into section end 23. Immediately adjacent cavities 27 define projections, or tenons, 31, the overall array of interrelated cavities and projections being thus interspersed in both first and second dimensions defining end face 29, the projections extending in a third dimension roughly parallel to the longitudinal axis of the wood grain. When thus arrayed (as best shown in FIGS. 3A and 3B illustrating mating arrays at the end of 2×6 sections), an architecture characterized by plural spaced series, or rows, 33 of projections 31 (spaced from one another in each series) results.

In formation of each joint architecture at each section end, section ends are cut square. Cavities 27 are drilled, or bored, substantially perpendicularly to the square cut end face, the cavities preferably being tapered (utilizing tapered bits as hereinafter described). The series 33 of projections defined by the array may be orthogonal, but need not be, and the rows need not be straight. The longitudinal profile of cavities may vary from cavity to cavity, and so may cavity spacing.

Figure 3B:
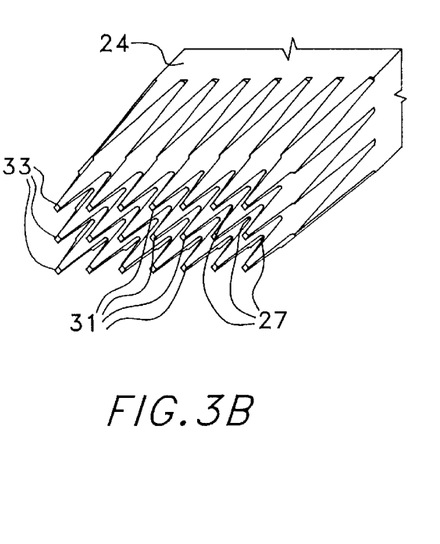
FIG. 3B is a perspective end view showing the mating finger joint architecture to that shown in FIG. 3A as formed at a second section end.
Figure 4A:
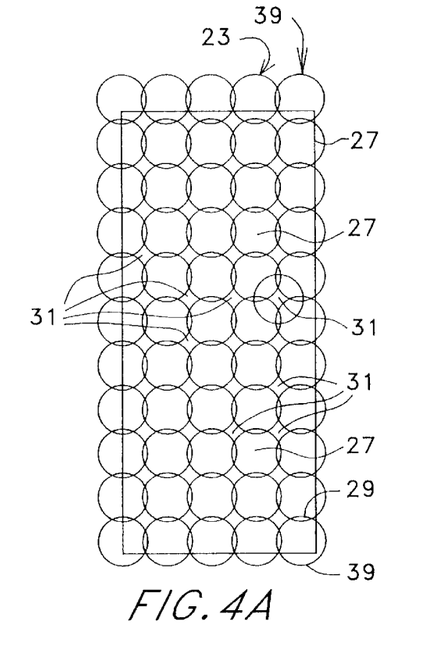
FIGS. 4A and 4B are end views illustrative of bore patterns utilized to form mating finger joint architectures in first and second wood product sections.
Figure 4B:
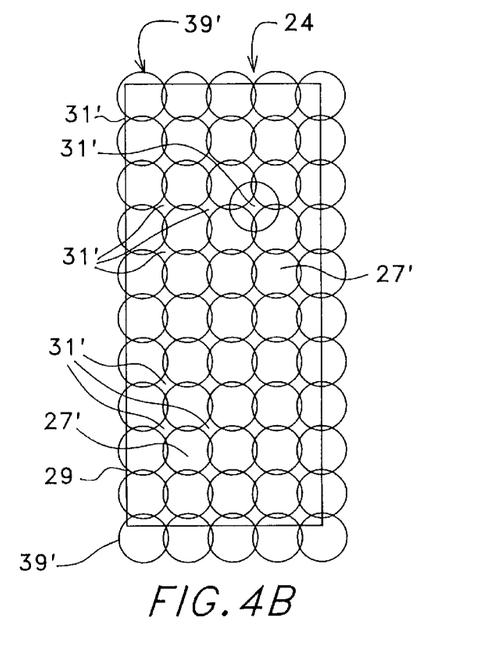

As shown in FIGS. 3B and 4A and 4B, the bore pattern for mating joint architectures must be shifted (3A/4A relative to 3B/4B) so that the mating architectures can be joined, with projections 31 at one end section receivable in cavities 27 of the other end section and vice versa. For the orthogonal arrays as illustrated in the FIGURES, a shifting of one half of the bore spacing (longitudinal bore axis to bore axis as shown in FIG. 2, from X to X', and FIGS. 4A and 4B) is required. Bore diameter at the end face may be any size relative to bore spacing, but in an orthogonal array preferably slightly larger than axis to axis spacing (but preferably not larger than the distance between bore axis of bores diagonally opposite a projection 31 see FIG. 2).

For best results, the cross sectional area of bores at point of deepest penetration 35 is preferably slightly greater than the cross sectional area of tips 37 of projections 31. The longitudinal profile of cavities 27 are preferably, but not necessarily, such that at any point along their length, their transverse cross sectional areas are large enough so that the opposing projections 31 can fit together with an adequate volume of adhesive (see FIGS. 5 and 6A through 6G). While liberal space is illustrated for bore/tenon interface in FIGS.

6A through 6G (where ease of fit but large adhesive volume is indicated), it is to be realized that bore sizing and spacing could be different, including relative configuration such that projections 31 fit tightly into cavities 27, using much less adhesive, and to the point that, under force, projections 31 cross sections will remold to fill the related cavity substantially entirely.

As shown in FIGS. 4A and 4B, partial bores 39 at the edges of the joint architecture are required so that the bore pattern extends throughout the end face. To assure a reasonably smooth wood surface, clamps (as discussed and shown hereinbelow) may be applied perpendicular to grain on one or both orthogonal axes of the joint during assembly to guide perimeter fibers. In addition, adhesives having lubricating qualities during assembly, midrange set times, and meeting structural and environmental requirements and standards will provide best results.

Figure 5:
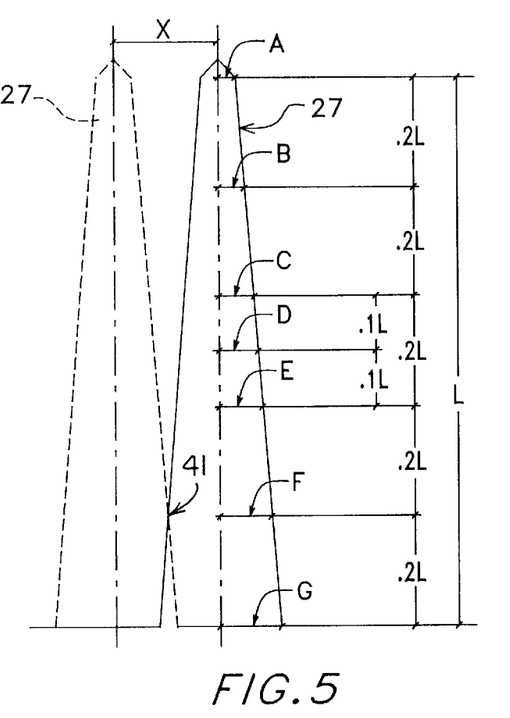
FIG. 5 is an illustration of a currently preferred bore profile.

As illustrated in FIG. 5, bore profiles of cavities 27 (and so resulting tenon profiles) need not be, and perhaps preferably are not, linearly tapered profiles from end to end, any narrowing profile (i.e., tapering in general), being preferred. Moreover, cavities 27 can be of any length L and spacing X. Varying time ratio of L/X will vary joint strength in much the same way as does varying length/pitch ratio of conventional finger joints. In conventional finger joints, minimizing the tip thickness of a wood product and the corresponding finger joint groove thickness of the opposing wood product has been shown by past research to increase joint strength (i.e., less wood is removed by minimizing tip and groove thickness thus increasing joint strength). As may be appreciated, the effective tip width of a tenon of this invention (and so cavity volume) may be further minimized over effective prior art tip thickness.

Where the bore pattern selection is such that cavity diameters intersect at the wood product section end face (as shown in FIGS. 3), ridges 41 are created between adjacent projections, or tenons, the depth from the end face of the ridges being depending upon bore spacing, diameter and profile. When assembled, ridge 41 of the two ends sections intersect causing splitting between fibers. As the joint continues to be assembled under end pressure, the adhesive lubricates the wood surfaces to facilitate maximum depth of assembly. As tenons 31 reach farther into the bores, the opposing ridges 41 interfere and lateral pressure builds between opposing tenon surfaces until refusal is reached, with the tenons fully seated in the cavities. At that point, a rigid mechanical bond is formed between opposing end sections, which allows handling during curing of the adhesive with only minimal care.

Figure 6A:
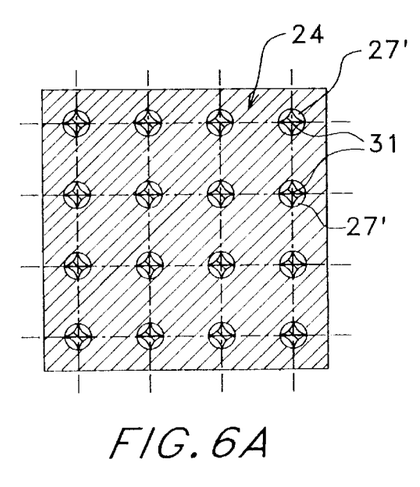
FIGS. 6A through 6G are schemata sectionally illustrating one embodiment of a completed joint.
Figure 6B:
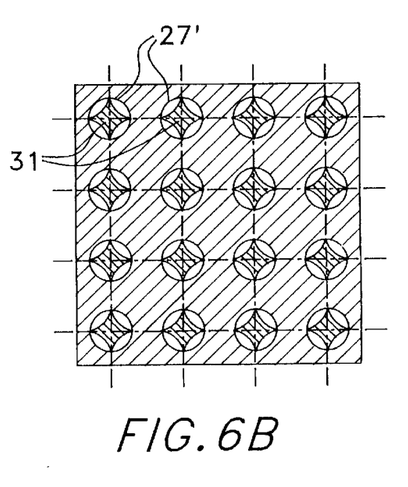
Figure 6C:
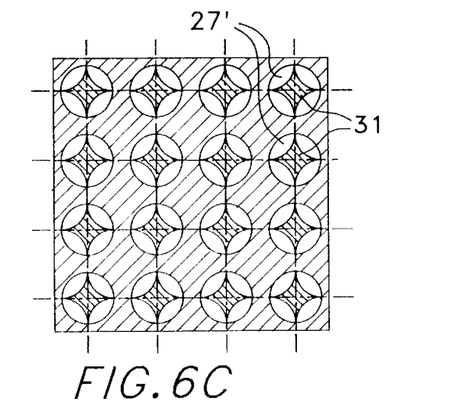
Figure 6D:
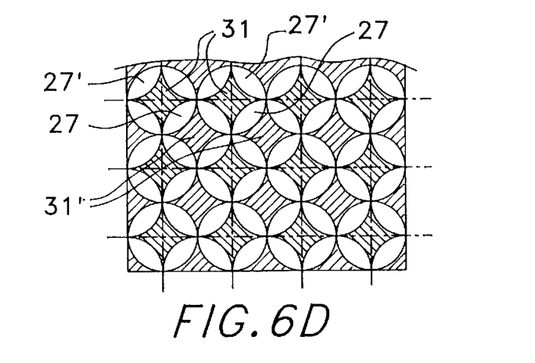
Figure 6E:
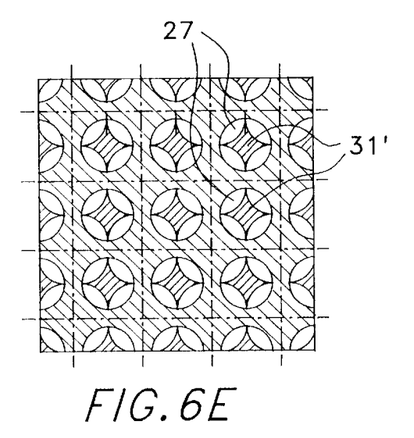
Figure 6F:
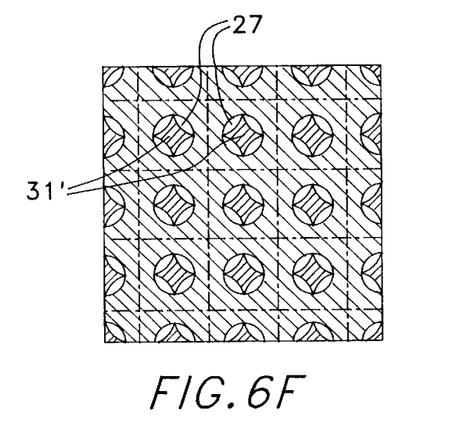
Figure 6G:
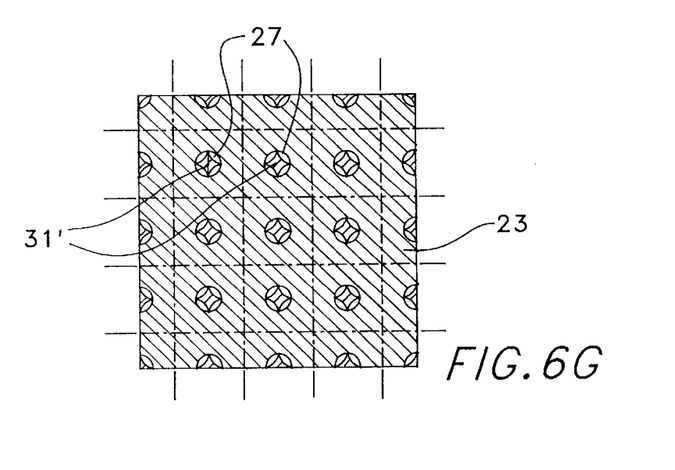
Figure 7:
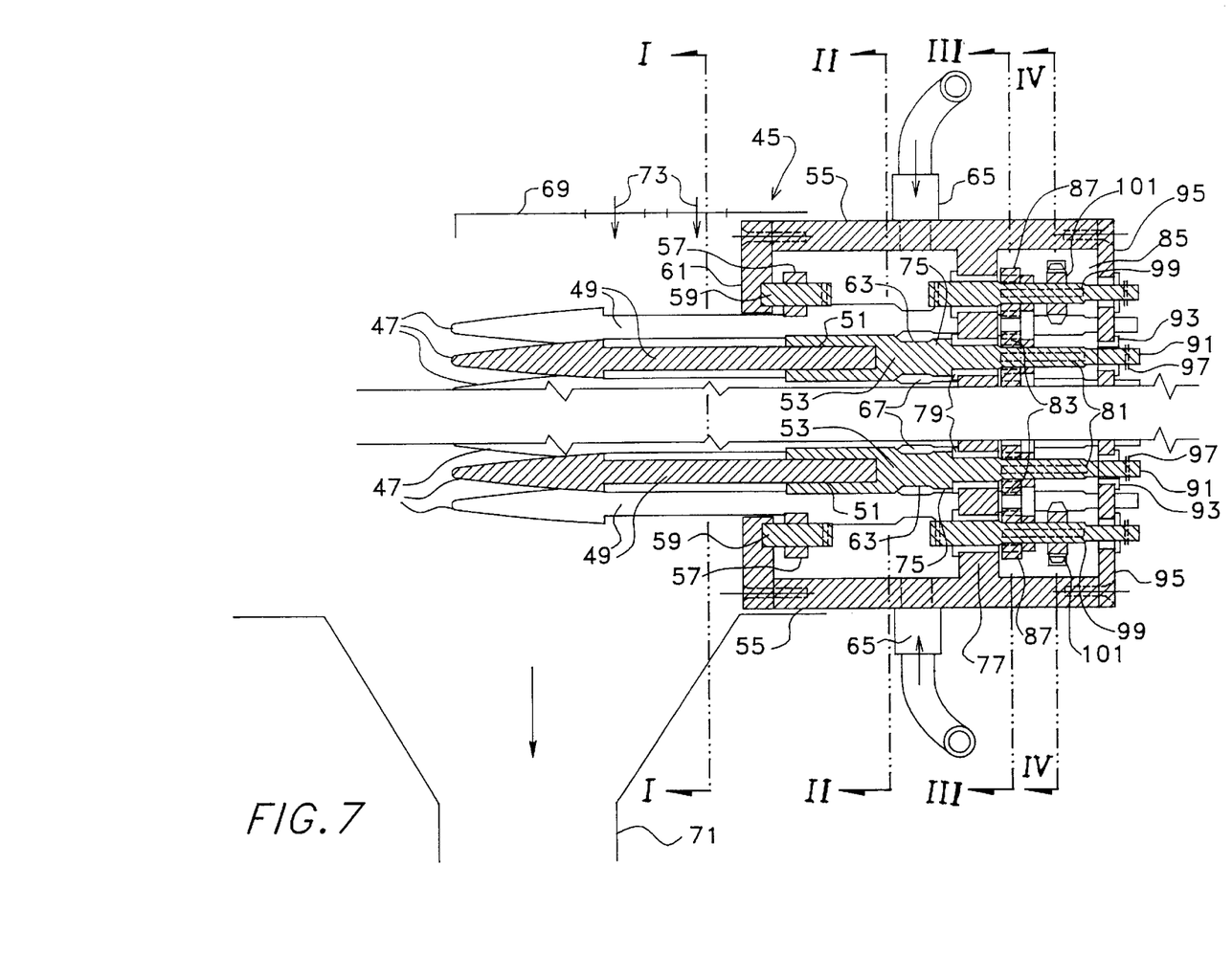
FIG. 7 is an illustration of an apparatus for forming the finger joint architecture in accord with this invention.
Figure 8A:
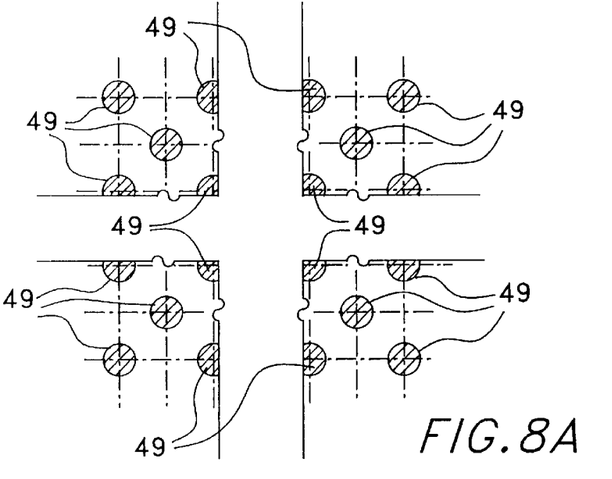
FIGS. 8A through 8D are sectional illustrations of the apparatus with reference to that illustrated in FIG. 7.
Figure 8B:
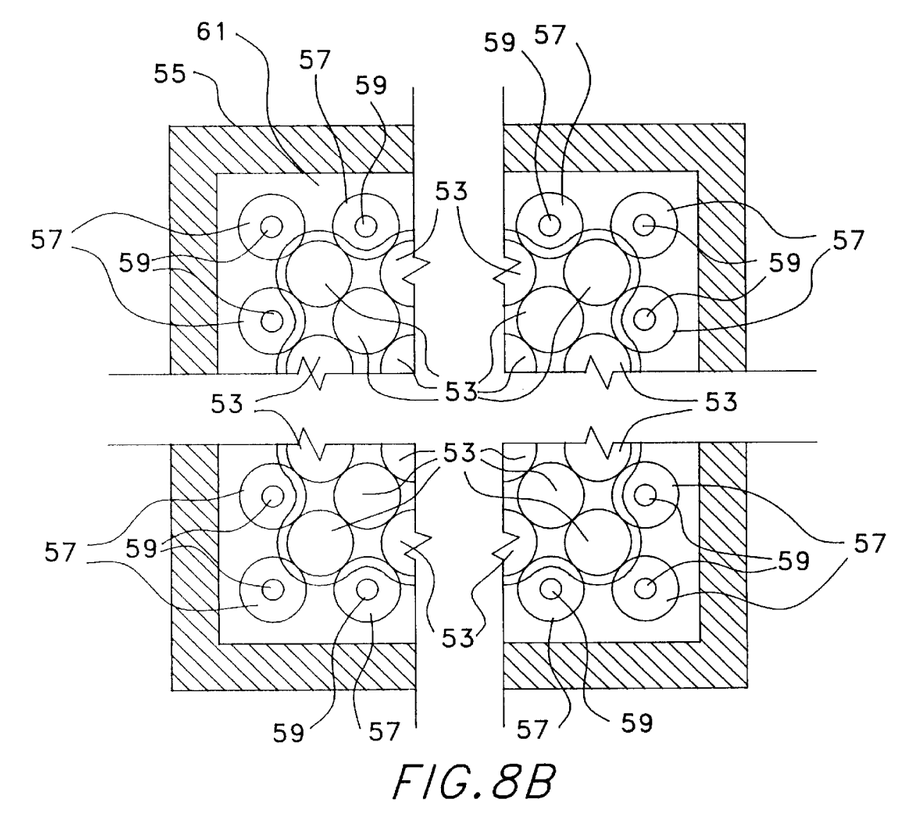
Figure 8C:
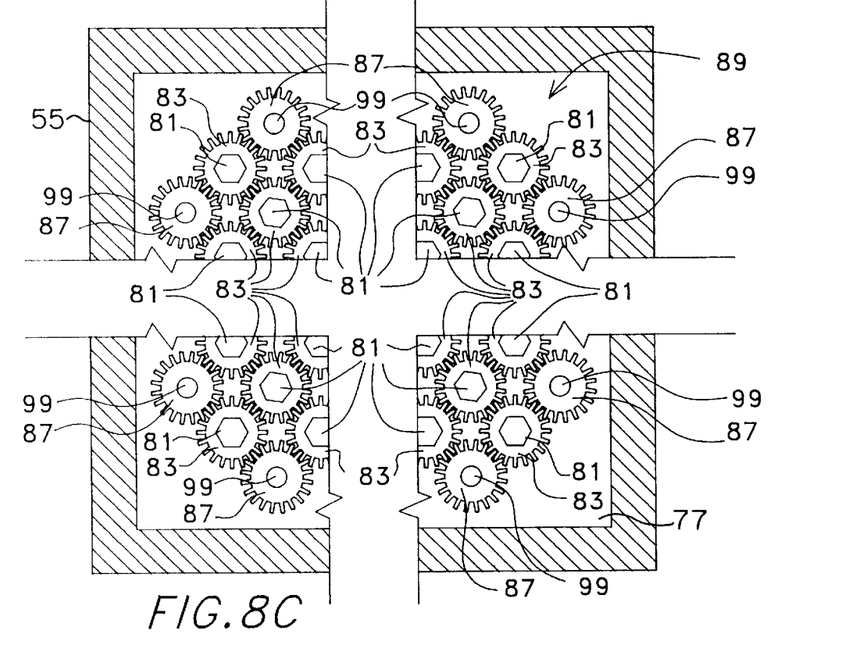
Figure 8D:
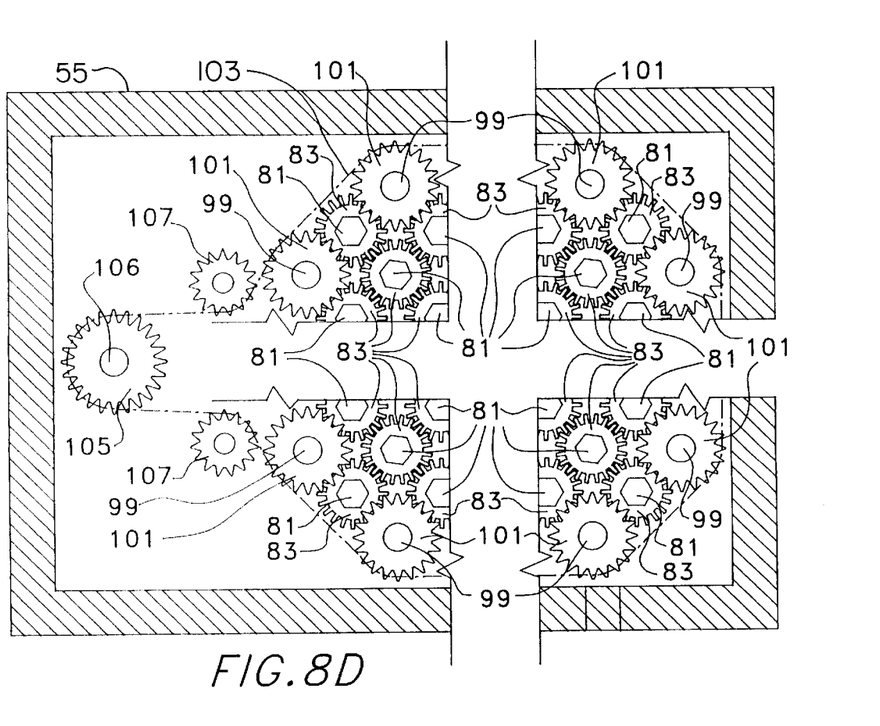
Figure 9A:
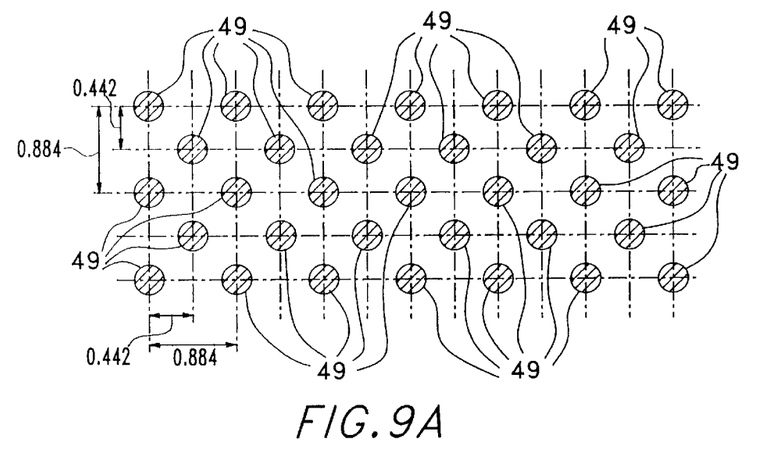
FIGS. 9A through 9D are sectional illustrations of an apparatus appropriate for finger joint architecture formation as shown in FIG. 3A.
Figure 9B:
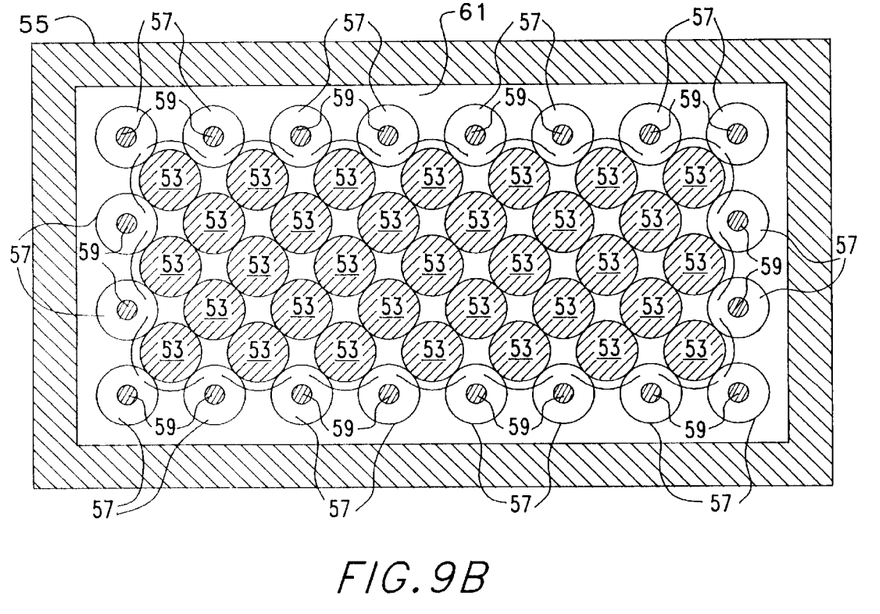
Figure 9C:
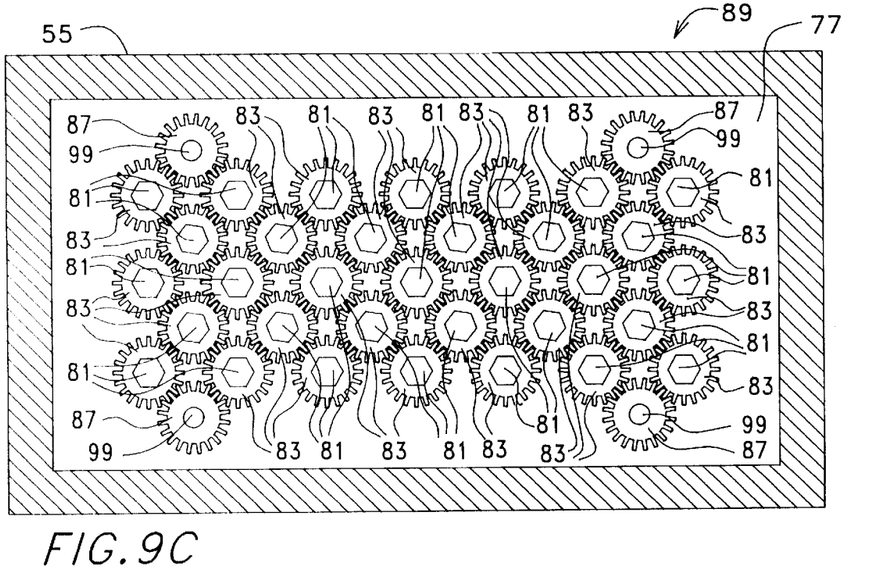
Figure 9D:
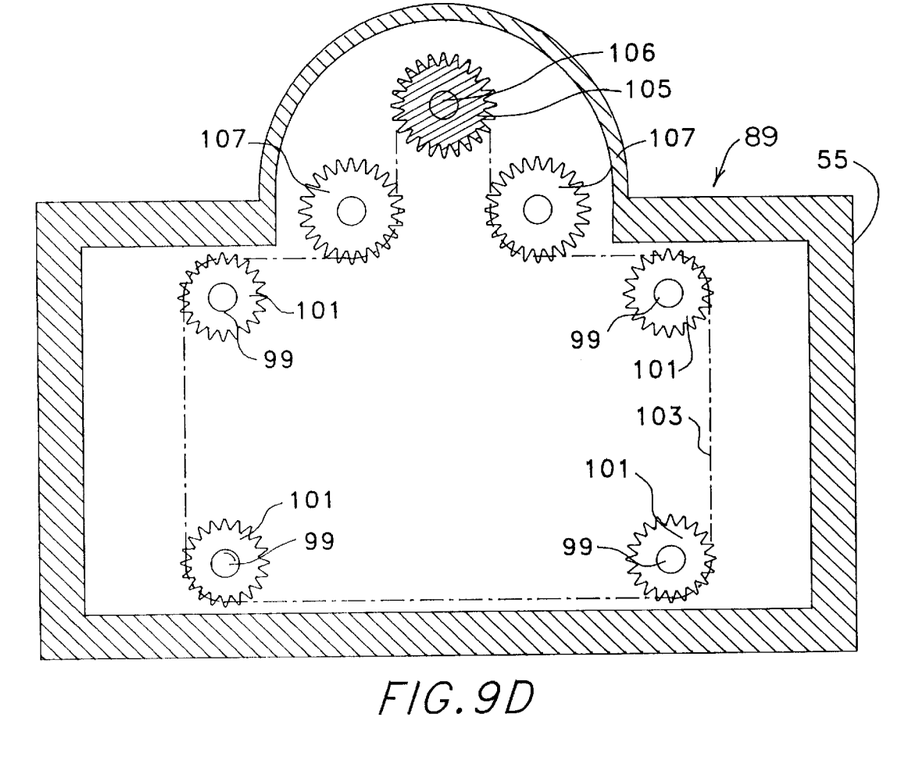
Figures 10A, 10B:
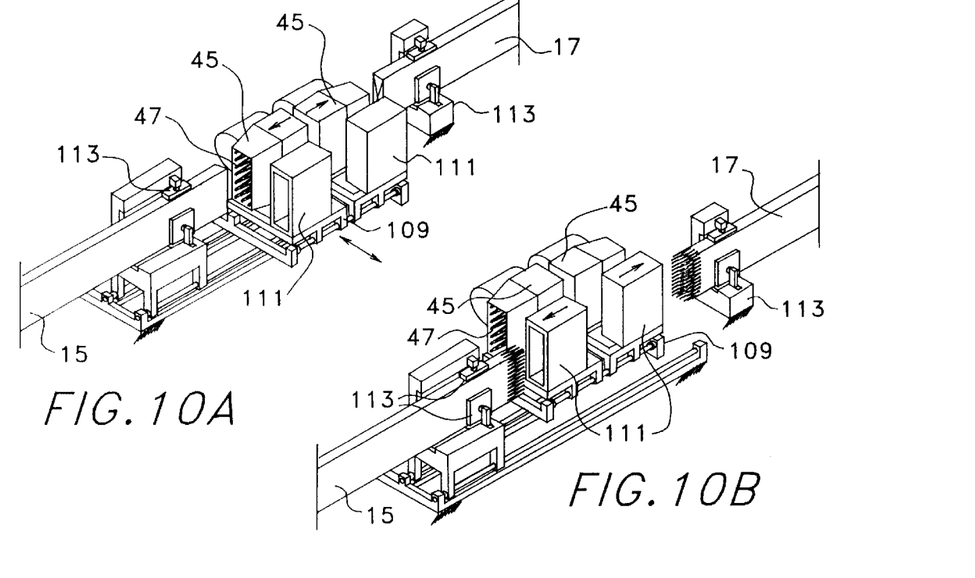
FIGS. 10A through 10D are perspective views illustrating use of the apparatus of FIG. 7 (in combination) to practice the method of this invention.
Figures 10C, 10D:
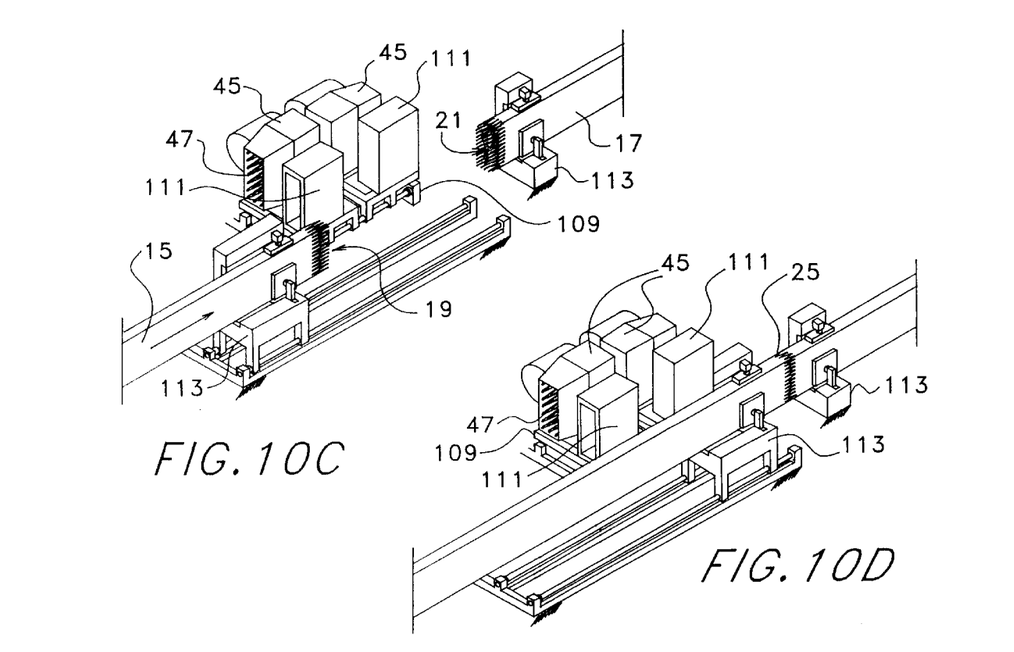

FIGS. 6A through 6G, with reference to bore depths shown in FIG. 5, illustrate joint cross sections at different bore depths and with projections 31 of one end section 23 secured in cavities 27' of the other end section 24 and with projections 31' of the end section 24 secured in cavities 27 of the end section 23. At the midpoint depth D as shown in FIG. 6D, neither end section (23 or 24) dominates the joint. Plural nonlinear adhesive interfaces are indicated at all depths, most of which are endless adhesive lines corresponding to cavity circumference. Thus, most tenon/bore interfaces are interior the joint cross section and are thereby not subject to environmental degradation.

Testing of the joint architecture of this invention indicates that structurally competitive wood products can be produced from a wide range of species and lumber types. No material geometric non-linearities (stress/strain curve) are introduced as a result of joint design, and flexural strength approaches that, in most cases, of solid sawn (i.e., unjointed) lumber of the same species, type, and grade.

Turning now to FIGS. 7 through 10, apparatus 45 is illustrated, the apparatus comprising a tool used in formation of the joint architecture of this invention. FIGS. 7 and 8A through 8D are sectional illustrations, divided at their centers to indicate that the apparatus may be expanded to meet wood product size requirements as necessary and utilizing the same principals as shown. FIGS. 9A through 9D correspond in section to FIGS. 8A through 8D and illustrate one embodiment of the apparatus as it might be configured for a particular dimensional lumber, in this case a 2×6 producing the joint architecture as illustrated in FIG. 3A.

A plurality (number selected to the architecture desired) of bits 47, each with a profile selected to produce the desired bore profile of cavities 27, are mounted at shafts 49 thereof in cylindrical sleeves 51 of bearing/drive shafts 53. Bits, shafts, and other moving and structural members are made of those materials known to skilled machine and tool manufacturers to meet the demands of the process. Shafts 49 and sleeve 51 diameters and connection characteristics are selected to permit failure in torsion of the shaft static connection to the sleeve in the event bits 47 encounter foreign objects in the wood product, such as nails, cement, bolts or the like.

Drive shafts 53 act as bearings, rolling against and restrained by adjacent parallel bearing/drive shafts and substantially filling tool casing 55. Restraint for perimeter ones of the shafts 53 is provided by rollers 57 mounted on shafts 59 anchored at frame member 61. Shaft recesses 63 are provided to accommodate compressed air delivery from port 65 to and around the machinery through passages 67 defined by adjacent recesses 63 of different shafts, and ultimately out of apparatus 45 between bits 49 to hood 69 and into a shop vacuum system through funnel 71. Air relief ports 73 are provided as is known to control air movement.

Concentric shoulders 75 of shafts 53 transfer axial thrust loads during drilling into rigid bulkhead 77 rigidly attached to casing 55. Shafts 53 are maintained through durable thrust bearings 79 mounted firmly in bulkhead 77. Shafts 53 are milled at an intermediate length of their terminal ends 81 into a suitable shape (square, hexagonal or the like) for use as a spline at a maximum diameter equal to or less than the shaft diameter. Spur gears 83 are mounted thereat with a snug but sliding fit, the spur gears configured to engage adjacent gears on diagonally adjacent shafts thus restraining position of gears within gear box 85. Power transfer gears 87 complete the bit drive set 89, each power transfer gear 87 engaging a pair of gears 83.

Shaft termini 91 are mounted through thrust bearings 93 firmly mounted in bulkhead 95 (bulkheads and casing are suitably fastened to one another to facilitate disassembly). Shafts 53 are retained thereat by washer and retaining clips 97. Power transfer gears, 87 are keyed to shafts 99 rotatably maintained through bushings mounted in the bulkheads. Chain sprocket gears 101 are keyed to shafts 99, or, in the alternative, may be anchored to gears 87 (in which case, the gear combinations would be rotatably mounted on fixed shafts 99).

Drive chain 103 engages drive sprocket 105 (connected with shaft 106 of, or linked to, an electric motor, not shown), take-up sprockets 107 and sprocket gears 101, the drive sprocket and take-up sprockets being appropriately rotationally mounted in gear box 85. Alternative drive systems could be utilized employing pneumatics, hydraulics, or other known drive techniques.

Turning now to FIGS. 10A through 10D, apparatus 45 is shown in a combination tool for carrying out joint architecture formation and joint securement. Apparatus 45 are firmly anchored at movable work surfaces 109, opposing apparatus 45 being provided with differently configured bit arrangements to form mating architecture as discussed above. Adhesive application systems 111 (as are already known in the industry) are mounted at surface 109, as may be a metal detecting stage (not shown) upstream of apparatus 45.

Wood product sections 15 and 17 are guided in clamp blocks 113 (the sections having been previously square cut), one or both of which are slidably maintained in a track system at a work surface. After the ends are scanned for foreign matter, the blocks are moved toward apparatus 45, or apparatus 45 are moved toward the wood product section ends depending on floor configuration. In either case, bits 47 are thrust (utilizing multiple operations if necessary) into the square cut end faces of sections 15 and 17 to the required depth.

Once the interrelated cavities and projections are formed, work surface 109 is shifted to align the formed joint architecture at each section with adhesive application systems 111, whereupon movement causes engagement of the application systems and joint architecture for adhesive coating. After coating, work surface 109 is again shifted so that the coated ends may be brought into engagement with selectively applied end pressure to finish joint 25. As discussed hereinabove, the mechanical bond achieved by the joint architecture of this invention allows almost immediate release of the finished jointed wood product from blocks 113 and movement to storage with only minimal care for the fresh joint.

As may be appreciated from the foregoing, many deviations from, and alternatives to, the methods and apparatus embodiments of this invention as disclosed hereinabove may be conceived of which would as well accomplish the purposes of the improved finger joint architecture of this invention.

What is claimed is:

1. A finger joint architecture formed at a surface area of a first wood product and adapted for securement at a selectively configured formation in a second wood product, said finger joint architecture characterized by plural series of projecting members wherein said projecting members in any one series are spaced from one another and from said projecting members in any adjacent series, said projecting members defined by a plurality of longitudinal cavities through the surface area into the first wood product, each of said cavities intersecting a part of another of said cavities at and a selected distance below the surface area.

2. The finger joint architecture of claim 1 wherein said projecting members are integrally formed from said first wood product and extend equidistantly to a free end.

3. The finger joint architecture of claim 2 wherein said projecting members are of diminishing bulk toward said free ends.

4. The finger joint architecture of claim 3 wherein cross sectional areas of said cavities at deepest penetration into the first wood product are slightly greater than cross sectional areas of said free ends of said protecting members.

5. The finger joint architecture of claim 1 wherein said cavities are tapered bores.

6. The finger joint architecture of claim 1 wherein ridges between adjacent projecting members are formed below the surface area of the first wood product by said intersection of cavities.

7. The finger joint of claim 1 wherein said projecting members project in substantially the same direction as direction of grain of said first wood product.

8. A finger joint architecture formed at an uninterrupted surface area of an end of a first wood product and adapted for securement at a selectively configured formation in a second wood product, said finger joint architecture characterized by plural rows of projecting members formed at the uninterrupted surface area of the end of the first wood product, each one of said rows having a plurality of said projecting members, said projecting members in any one row formed at the uninterrupted surface area being spaced from one another and from said projecting members in an adjacent row formed at the uninterrupted surface area.

9. The finger joint architecture of claim 8 wherein a majority of said projecting members are defined by tapered bores forming at least three sides of each one of said majority of said projecting members, said bores formed in plural rows through the end surface area and into the first wood product.

10. The finger joint architecture of claim 9 wherein a majority of said bores are formed entirely interior the end surface area.

11. The finger joint architecture of claim 9 wherein the first wood product has a wood grain direction that is substantially parallel to length of the first wood product and wherein said bores are formed with a bore axis substantially in the direction of the wood grain.

12. The finger joint architecture of claim 9 wherein said projecting members and said bores are tapered, direction of taper of said projecting members being opposite direction of taper of said bores.

13. A finger joint architecture formed at an uninterrupted end face of a first dimensional lumber section and adapted for securement at a selectively configured formation in a second dimensional lumber section end face, said finger joint architecture characterized by an array of interrelated tenons and bores each interspersed in both first and second dimensions relative to the uninterrupted end face of the first dimensional lumber section, many of said tenons formed entirely interior the uninterrupted end face of the first dimensional lumber section, said bores defining said interiorly formed tenons.

14. The finger joint architecture of claim 13 wherein said tenons and bores are interrelated in that for a majority of said tenons each is defined by four of said bores.

15. The finger joint architecture of claim 13 wherein said tenons bores tapered toward a free end.

16. The finger joint architecture of claim 13 wherein said bores are tapered.

17. The finger joint architecture of claim 13 wherein said tenons and said bores are formed with axes thereof substantially perpendicular to the uninterrupted end face.

18. The finger joint architecture of claim 13 wherein each one of said bores defines a cavity volume exceeding overall material volume of each one of said tenons.

* * * * *